(12) United States Patent  (10) Patent No.: US 12,254,792 B2
Pyo  (45) Date of Patent: Mar. 18, 2025

(54) DISPLAY DEVICE

(71) Applicant: LG ELECTRONICS INC., Seoul (KR)

(72) Inventor: Jonggil Pyo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 17/788,911

(22) PCT Filed: Dec. 27, 2019

(86) PCT No.: PCT/KR2019/018649
§ 371 (c)(1),
(2) Date: Jun. 24, 2022

(87) PCT Pub. No.: WO2021/132780
PCT Pub. Date: Jul. 1, 2021

(65) Prior Publication Data
US 2023/0030033 A1  Feb. 2, 2023

(51) Int. Cl.
*G06F 1/16* (2006.01)
*G09F 9/30* (2006.01)

(52) U.S. Cl.
CPC ............ *G09F 9/301* (2013.01); *G06F 1/1652* (2013.01)

(58) Field of Classification Search
CPC .................... G09F 9/301; G06F 1/16
See application file for complete search history.

(56) References Cited

U.S. PATENT DOCUMENTS

| | | | |
|---|---|---|---|
| 4,846,241 A | 7/1989 | Chomka et al. | |
| 10,194,543 B2 * | 1/2019 | Seo | G09F 9/301 |
| 10,314,183 B2 * | 6/2019 | Heo | H05K 5/0217 |
| 10,506,726 B2 * | 12/2019 | Kang | H10K 77/111 |
| 10,534,402 B1 * | 1/2020 | Kim | H05K 1/118 |
| 11,127,322 B2 * | 9/2021 | Han | G06F 1/1652 |
| 11,140,790 B2 * | 10/2021 | Kim | H05K 5/03 |
| 11,423,810 B2 * | 8/2022 | He | G09F 9/301 |
| 11,439,030 B2 * | 9/2022 | Pyo | G09F 9/301 |
| 11,800,657 B2 * | 10/2023 | Jiang | G09F 9/301 |
| 11,823,596 B2 * | 11/2023 | Pyo | G06F 1/1652 |
| 11,963,323 B2 * | 4/2024 | Zhang | G09F 9/301 |
| 2007/0209251 A1 | 9/2007 | Zheng et al. | |

(Continued)

FOREIGN PATENT DOCUMENTS

| KR | 10-2017-0066838 | 6/2017 |
|---|---|---|
| KR | 10-2017-0081347 | 7/2017 |
| KR | 10-2019-0054430 | 5/2019 |

OTHER PUBLICATIONS

PCT International Application No. PCT/KR2019/018649, International Search Report dated Sep. 21. 2020, 4 pages.

*Primary Examiner* — Rockshana D Chowdhury

(74) *Attorney, Agent, or Firm* — LEE, HONG, DEGERMAN, KANG & WAIMEY

(57) ABSTRACT

Disclosed is a display device. The display device of the present disclosure includes: a flexible display panel; a roller which extends long, and on which the display panel is wound or from which the display panel is unwound; a first pipe which extends long in a length direction of the roller, and is located adjacent to the roller; and a second pipe which extends long in a length direction of the roller, and is located adjacent to the roller, and faces the first pipe with respect to the roller.

13 Claims, 24 Drawing Sheets

(56) References Cited

U.S. PATENT DOCUMENTS

| | | | |
|---|---|---|---|
| 2009/0302176 A1* | 12/2009 | Kuroi | F16M 11/26 |
| | | | 248/176.1 |
| 2017/0196102 A1* | 7/2017 | Shin | G06F 1/1605 |
| 2018/0103551 A1* | 4/2018 | Park | H05K 5/0217 |
| 2018/0160554 A1* | 6/2018 | Kang | H05K 5/0017 |
| 2020/0135064 A1* | 4/2020 | Lee | G06F 1/1684 |
| 2020/0272271 A1* | 8/2020 | Seo | G06F 1/3265 |

\* cited by examiner

DISPLAY DEVICE

CROSS-REFERENCE TO RELATED APPLICATIONS

This application is the National Stage filing under 35 U.S.C. 371 of International Application No. PCT/KR2019/018649, filed on Dec. 27, 2019, the contents of which are hereby incorporated by reference herein its entirety.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), Plasma Display Panel (PDP), Electroluminescent Display (ELD), and Vacuum Fluorescent Display (VFD) have been researched and used in recent years.

Among them, a display device using an organic light emitting diode (OLED) has superior luminance characteristics and viewing angle characteristics compared to a liquid crystal display device, and can be implemented in an ultra-thin shape as it does not require a backlight unit.

In addition, a flexible display panel can be bent or wound on a roller. By using the flexible display panel, it is possible to implement a display device that is roll out from a roller or wound on a roller. A lot of research has been done on a structure for winding or unwinding a flexible display panel on/from a roller.

DISCLOSURE

Technical Problem

An object of the present disclosure is to solve the above and other problems.

Another object may be to secure a structural rigidity to prevent sagging of a display device.

Another object may be to secure a structural rigidity to prevent torsion of a display device.

Technical Solution

In an aspect, there is provided a display device, including: a flexible display panel; a roller which extends long, and on which the display panel is wound or from which the display panel is unwound; a first pipe which extends long in a length direction of the roller, and is located adjacent to the roller; and a second pipe which extends long in a length direction of the roller, and is located adjacent to the roller, and faces the first pipe with respect to the roller.

Advantageous Effects

The effect of the display device according to the present disclosure will be described as follows.

According to at least one of the embodiments of the present disclosure, a structural rigidity for preventing the display device from sagging may be secured.

According to at least one of the embodiments of the present disclosure, a structural rigidity for preventing torsion of the display device may be secured.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Figure 1:
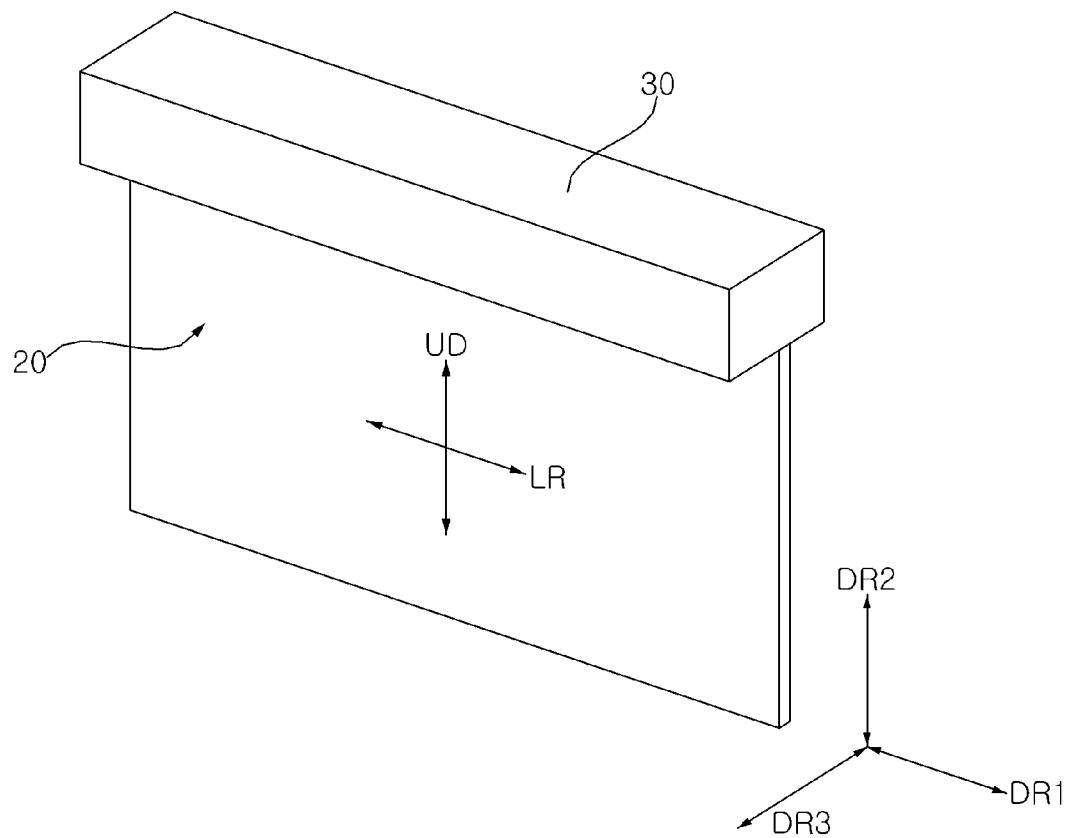
FIGS. 1 to 24 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if the embodiment is described with reference to specific drawings, if necessary, reference numerals not appearing in the specific drawings may be referred to, and reference numerals not appearing in the specific drawings are used in a case where the above reference numerals appear in the other figures.

Referring to FIG. 1, a display device 100 may include a display unit 20 and a housing 30. The housing 30 may have an internal space. At least a portion of the display unit 20 may be located inside the housing 30. At least a portion of the display unit 20 may be located outside the housing 30. The display unit 20 may display a screen.

A direction parallel to the length direction of the housing 30 may be referred to as a first direction DR1, a left direction, or a right direction. A direction in which the display unit 20 displays a screen may be referred to a front side direction, or a forward direction. A direction opposite to the direction in which the display unit 20 displays a screen may be referred to as a rear side direction, or a rearward direction. A direction parallel to a height direction of the display device 100 may be referred to as a second direction DR2, an upper direction, or a lower direction.

A third direction DR3 may be a direction perpendicular to the first direction DR1 and/or the second direction DR2. The first direction DR1 and the second direction DR2 may be collectively referred to as a horizontal direction. In addition, the third direction DR3 may be referred to as a vertical direction. The left-right direction LR may be parallel to the first direction DR1, and the up-down direction UD may be parallel to the second direction DR2.

Figure 2:
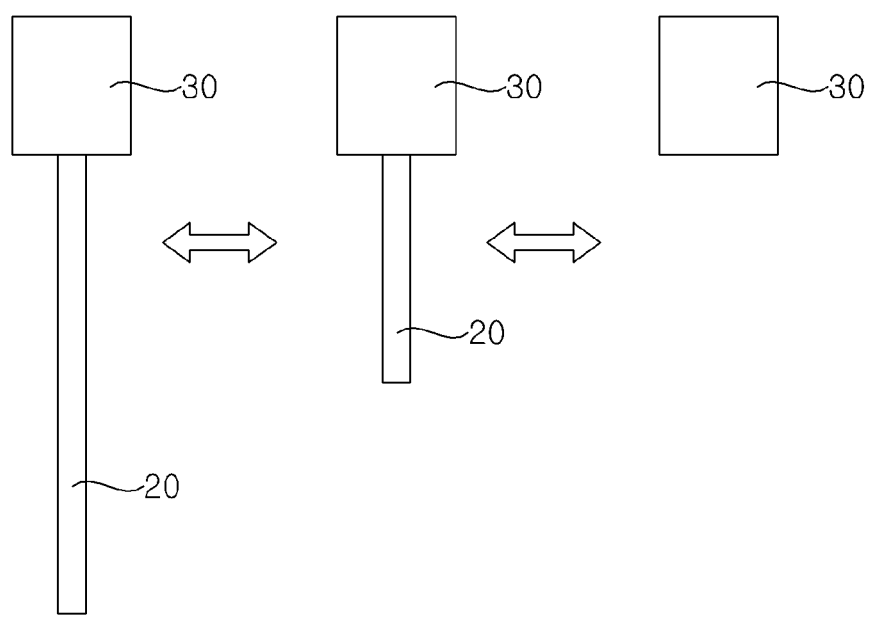

Referring to FIG. 2, the entire display unit 20 may be located inside the housing 30. At least a portion of the display unit 20 may be located outside the housing 30. The extent to which the display unit 20 is exposed to the outside of the housing 30 may be adjusted as necessary.

Figure 3:
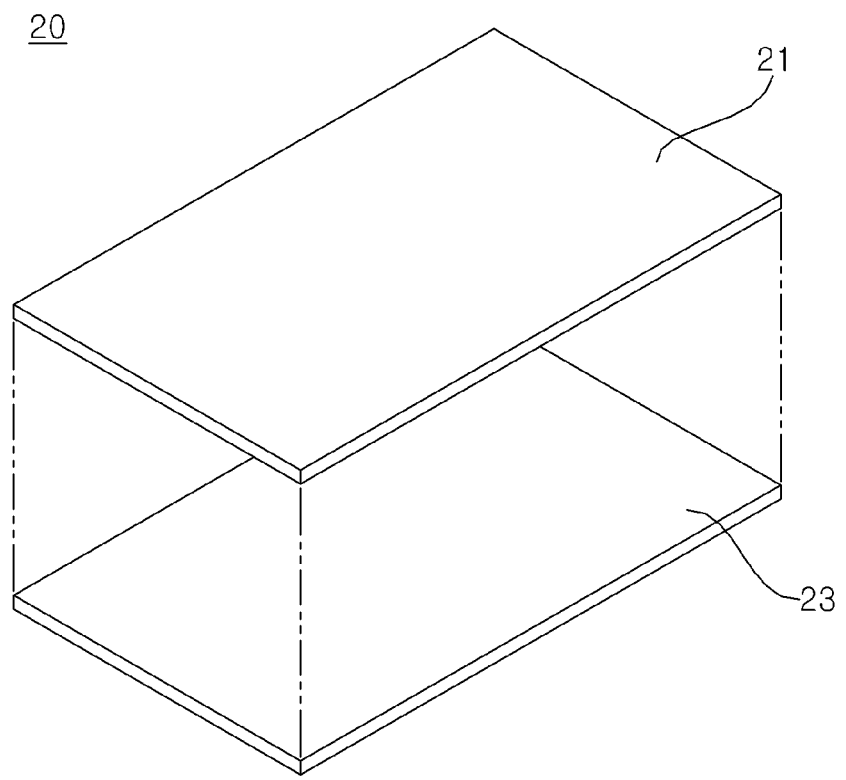

Referring to FIG. 3, the display unit 20 may include a display panel 21 and a plate 23. The display panel 21 may be flexible. For example, the display panel 21 may be an organic light emitting display (OLED).

The display panel 21 may have a front surface for displaying an image. The display panel 21 may have a rear surface opposite to the front surface. The front surface of the display panel 21 may be covered with a light-transmitting material. For example, the light-transmitting material may be a synthetic resin or a film.

The plate 23 may be coupled, fastened, or attached to the rear surface of the display panel 21. The plate 23 may include a metal material. The plate 23 may be referred to as a module cover 23, a cover 23, a display panel cover 23, a panel cover 23, or an apron 23.

Figure 4:
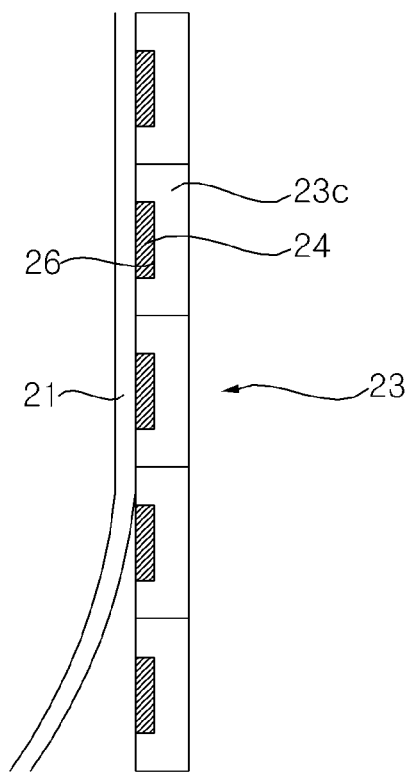

Referring to FIG. 4, the plate 23 may include a plurality of segments 23c. A magnet 24 may be located inside a recess 26 of the segment 23c. The recess 26 may be located on a surface of the segment 23c facing the display panel 21. The recess 26 may be located in the front surface of each segment 23c. Since the magnet 24 is received inside the recess 26, the magnet 24 may not protrude out of the segment 23c. The display panel 21 may be flat without being crumpled even when it comes into contact with the segment 23c.

Figure 5:
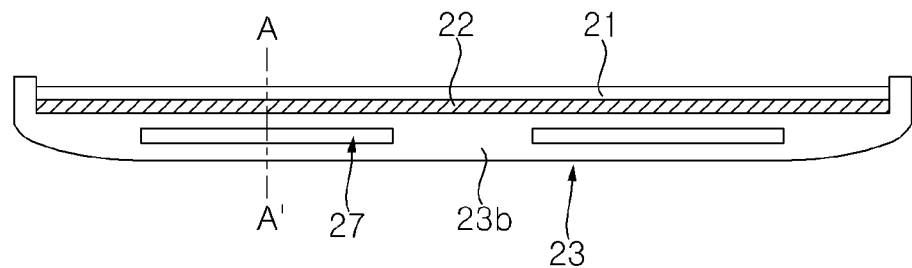
Figure 5:
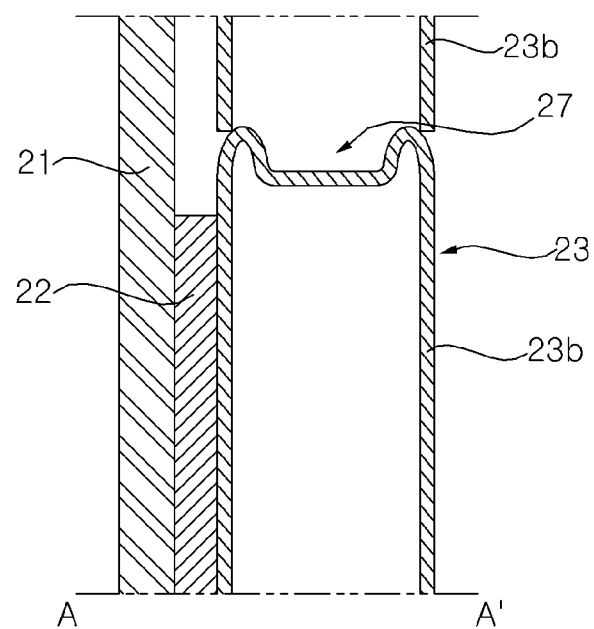

Referring to FIG. 5, a bead 27 may be formed on the upper surface of the segment 23b. The bead 27 may have a shape recessed into the inside of the segment 23b. For example, the bead 27 may be formed by pressing the segment 23b. A plurality of beads 27 may be formed on the segment 23b. The plurality of beads 27 may be spaced apart from each other. The bead 27 may improve the rigidity of the segment 23b. The bead 27 may prevent the shape of the segment 23b from being deformed from an external impact. The segment 23b may be fixed to the rearward direction of the display panel 21 by an adhesive member 22. For example, the adhesive member 22 may be a double-sided tape.

Figure 6:
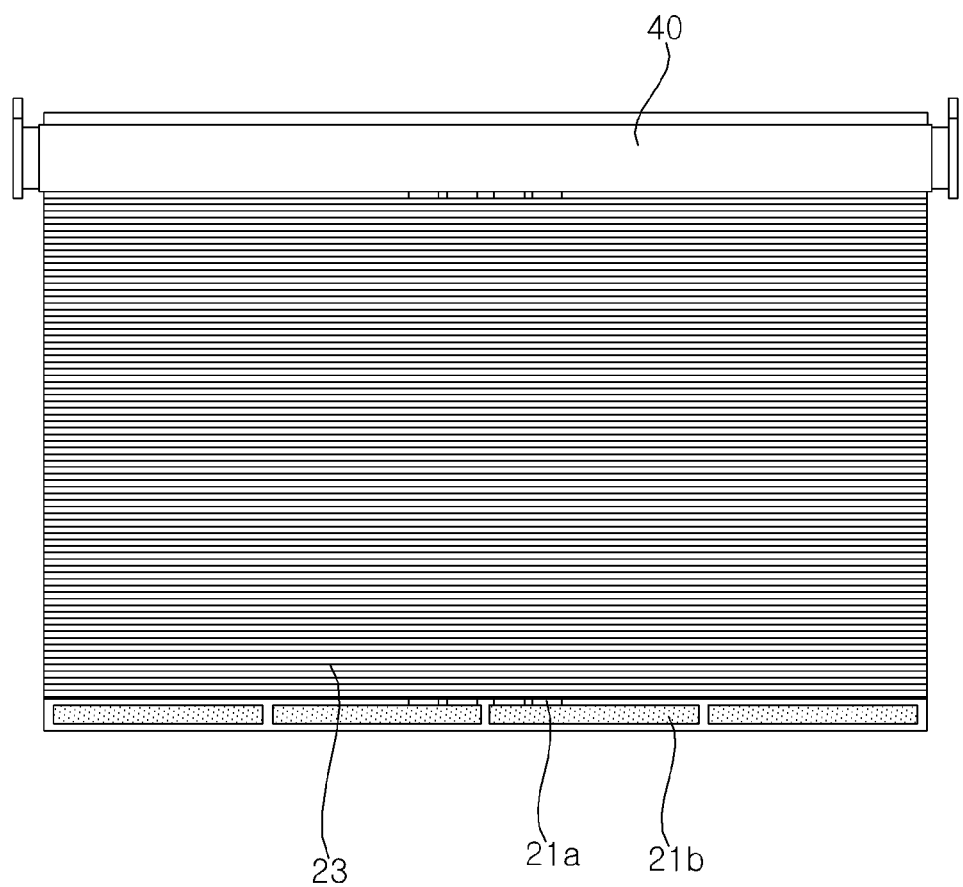

Referring to FIG. 6, a source PCB 21b may be located in the lower side of the module cover 23. When the source PCB 21b is rolled down or rolled up, the position may change with the movement of the module cover 23. A FFC cable 21a may be located in the center portion of the module cover 23 based on a first direction. The FFC cable 21a may be located in opposite ends of the module cover 23 based on the first direction.

Figure 7:
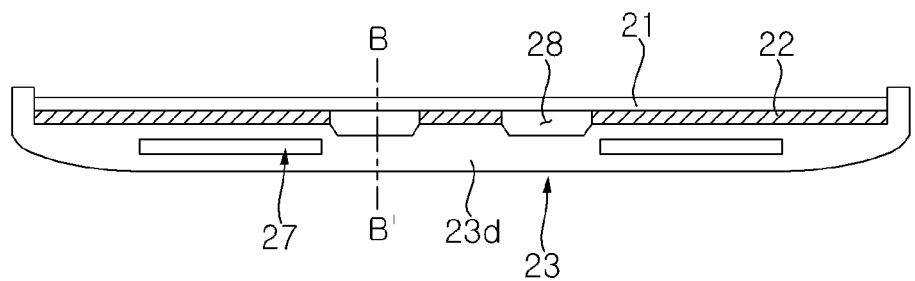
Figure 7:
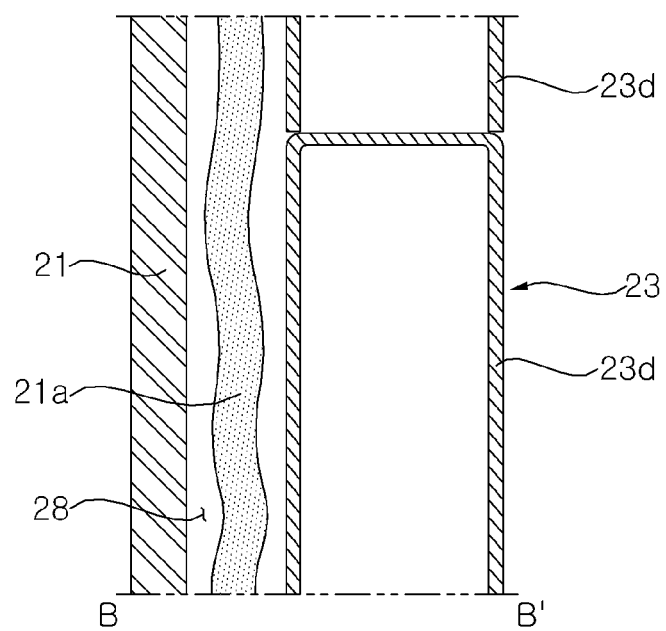

Referring to FIG. 7, the segment 23d may include a recessed portion 28 that is recessed in the inner side. The recessed portion 28 may form a space between the display panel 21 and the module cover 23. The FFC cable 21a may be received in a space formed by the recessed portion 28. In addition, the recessed portion 28 may improve the rigidity of the segment 23d. The bead 27 may be located on the segment 23d excluding a portion where the recessed portion 28 is located. The position of the recessed portion 28 may not overlap with the position of the bead 27 so as to prevent the rigidity of segment 23d from weakening.

Figure 8:
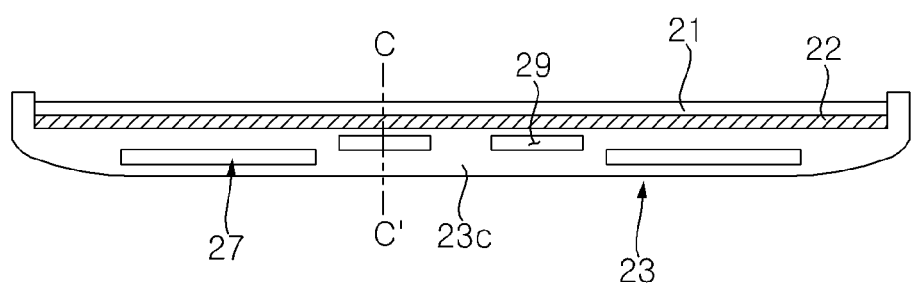
Figure 8:
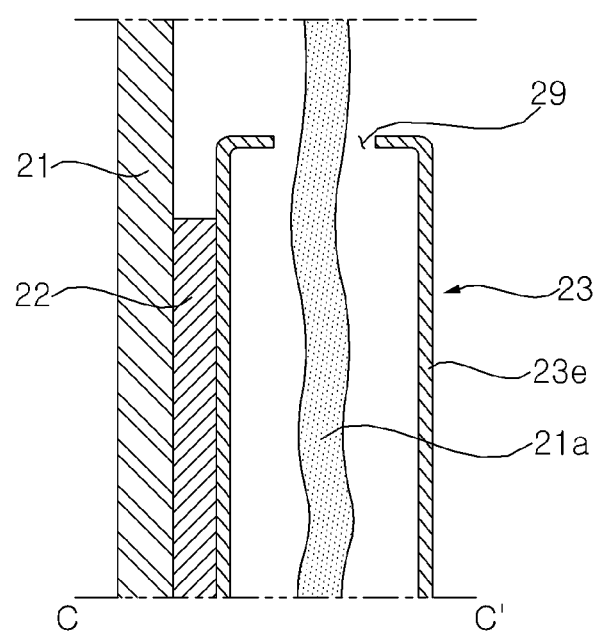

Referring to FIG. 8, a penetrating portion 29 may be located in the center portion of the segment 23e based on the first direction. The penetrating portion 29 may penetrate the central portion of the segment 23e in the second direction. That is, the penetrating portion 29 may be a hole located in the segment 23e. The penetrating portion 29 may be a portion in which the FFC cable 21a is located. Since the penetrating portion 29 is formed inside the segment 23e, the thickness of the segment 23e may be reduced compared to a case where the FFC cable 21a is located in the recessed portion 28 (see FIG. 7). The bead 27 may be located on the segment 23e excluding a portion where the penetrating portion 29 is located. The position of the penetrating portion 29 may not overlap with the position of the bead 27 so as to prevent the rigidity of segment 23e from weakening.

Figure 9:
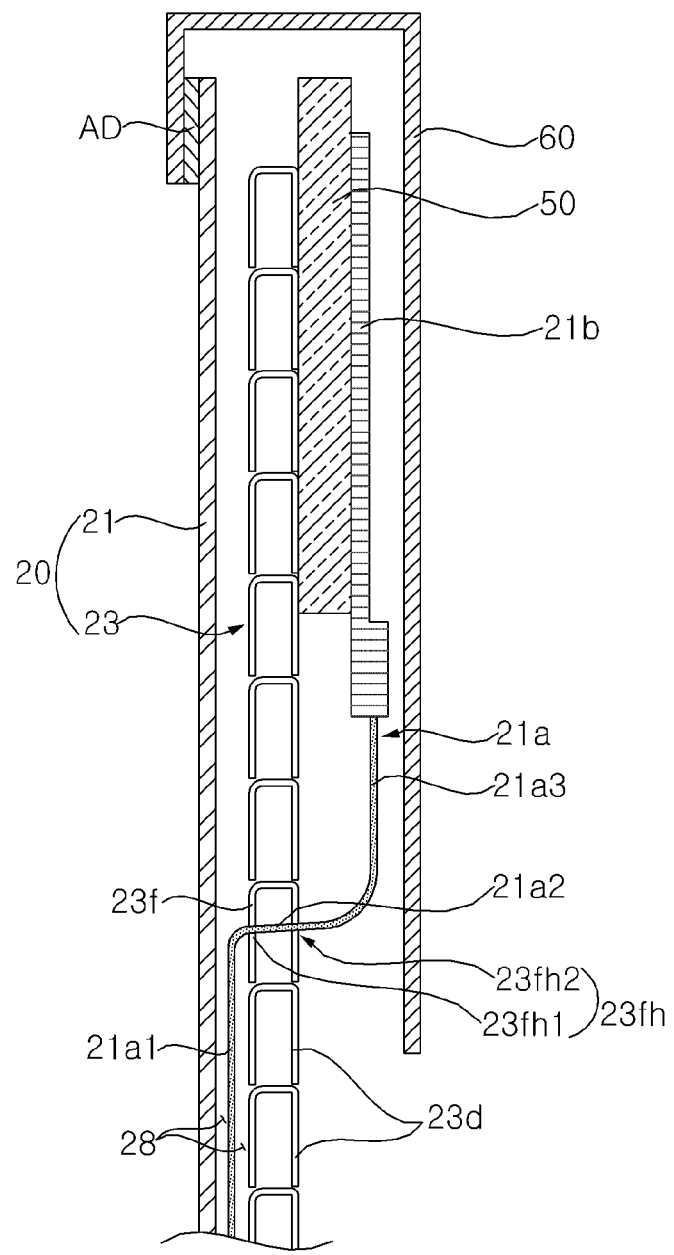

Referring to FIG. 9, a top case 60 may cover the source PCB 21b and the upper bar 50 as well as the display panel 21 and the module cover 23. One surface of the upper bar 50 may be coupled to the rear surface of the module cover 23, and the other surface may be coupled to the source PCB 21b. The upper bar 50 may be fixed to the module cover 23 to support the source PCB 21b.

Figure 10:
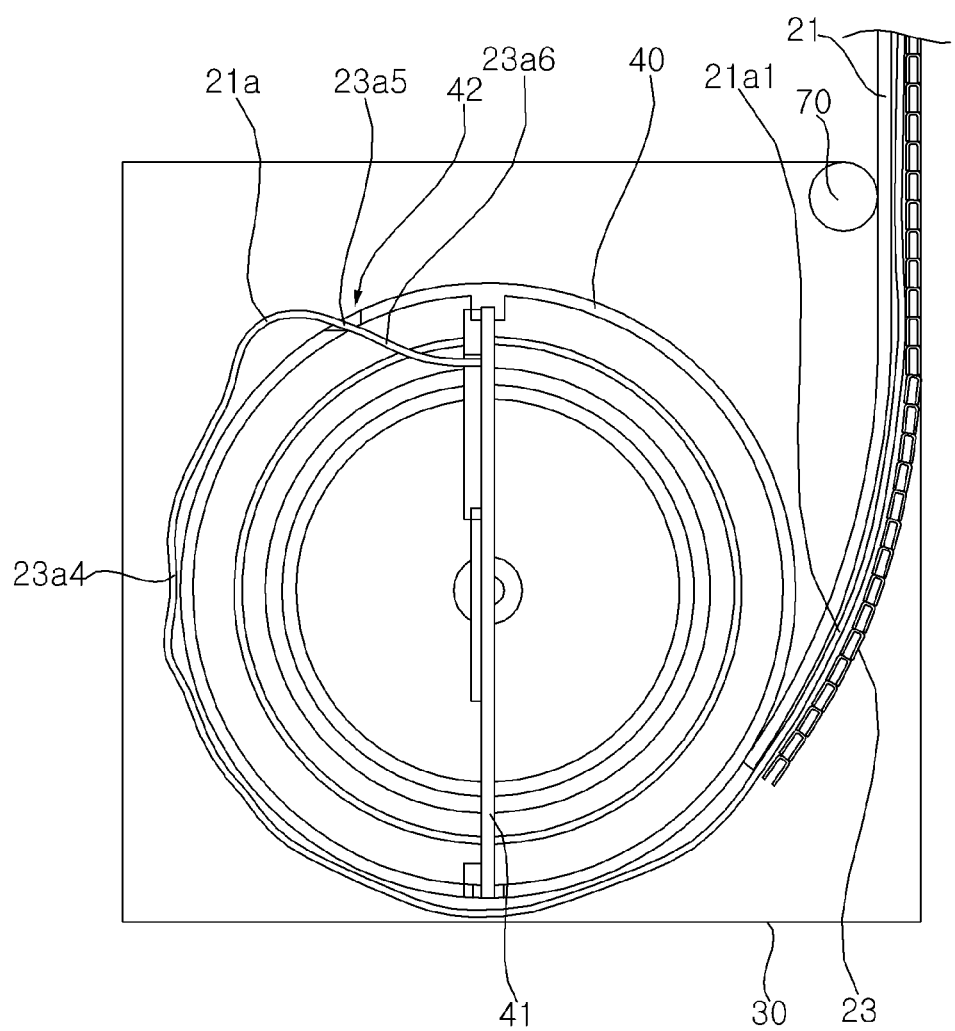

The lower end of the FFC cable 21a may be connected to a timing controller board 41 (see FIG. 10) inside a panel roller 40 (see FIG. 10). The FFC cable 21a may be wound on or unwound from the panel roller 40 together with the display unit 20.

A portion of the FFC cable 21a may be located between the display panel 21 and the module cover 23. A portion of the FFC cable 21a located between the display panel 21 and the module cover 23 may be referred to as a first portion 21a1. The first portion 21a1 may be located in the recessed portion 28 formed by the plurality of segments 23d. Alternatively, the first portion 21a1 may be received in the recessed portion 28 formed by the plurality of segments 23d.

A portion of the FFC cable 21a may penetrate the segment 23f. A portion of the FFC cable 21a penetrating the segment 23f may be referred to as a second portion 21a2. The segment 23f may include a first hole 23fh1 formed on the front surface and a second hole 23fh2 formed on the rear surface. The first hole 23fh1 and the second hole 23fh2 may be interconnected to form one hole 23fh. The hole 23fh may penetrate the segment 23f in the third direction. The second portion 21a2 may penetrate the hole 23fh. The hole 23fh may be referred to as a connection hole 23fh.

An upper end of the FFC cable 21a may be electrically connected to the source PCB 21b. A portion of the FFC cable 21a may be located on the rear surface of the module cover 23. A portion of the FFC cable 21a located on the rear surface of the module cover 23 may be referred to as a third portion 21a3. The third portion 21a3 may be electrically connected to the source PCB 21b.

The third portion 21a3 may be covered by the top case 60. Accordingly, the third portion 21a3 may not be exposed to the outside.

Referring to FIG. 10, the FFC cable 21a may be connected to the timing controller board 41 mounted in the panel roller 40. A penetrating hole 42 may be formed on the panel roller 40, and the FFC cable 21*a* may be connected to the timing controller board 41 through the penetrating hole 42.

The penetrating hole 42 may be located in one side of the panel roller 40 and may penetrate the outer circumferential portion of the panel roller 40. The FFC cable 21*a* may be connected to one side of the timing controller board 41 through the penetrating hole 42.

Even when the FFC cable 21*a* is located on the outer circumference of the panel roller 40, the connection to the timing controller board 41 may be maintained due to the penetrating hole 42. Accordingly, the FFC cable 21*a* may not be twisted by rotating together with the panel roller 40.

A portion of the FFC cable 21*a* may be wound around the panel roller 40. A portion of the FFC cable 21*a* wound around the panel roller 40 may be referred to as a fourth portion 23*a*4. The fourth portion 23*a*4 may be in contact with the outer circumferential surface of the panel roller 40.

A portion of the FFC cable 21*a* may penetrate the penetrating hole 42. A portion of the FFC cable 21*a* passing through the penetrating hole 42 may be referred to as a fifth portion 23*a*5.

A lower end of the FFC cable 21*a* may be electrically connected to the timing controller board 41. A portion of the FFC cable 21*a* may be located inside the panel roller 40. A portion of the FFC cable 21*a* located inside the panel roller 40 may be referred to as a sixth portion 23*a*6. The sixth portion 23*a*6 may be electrically connected to the timing controller board 41.

Figure 11:
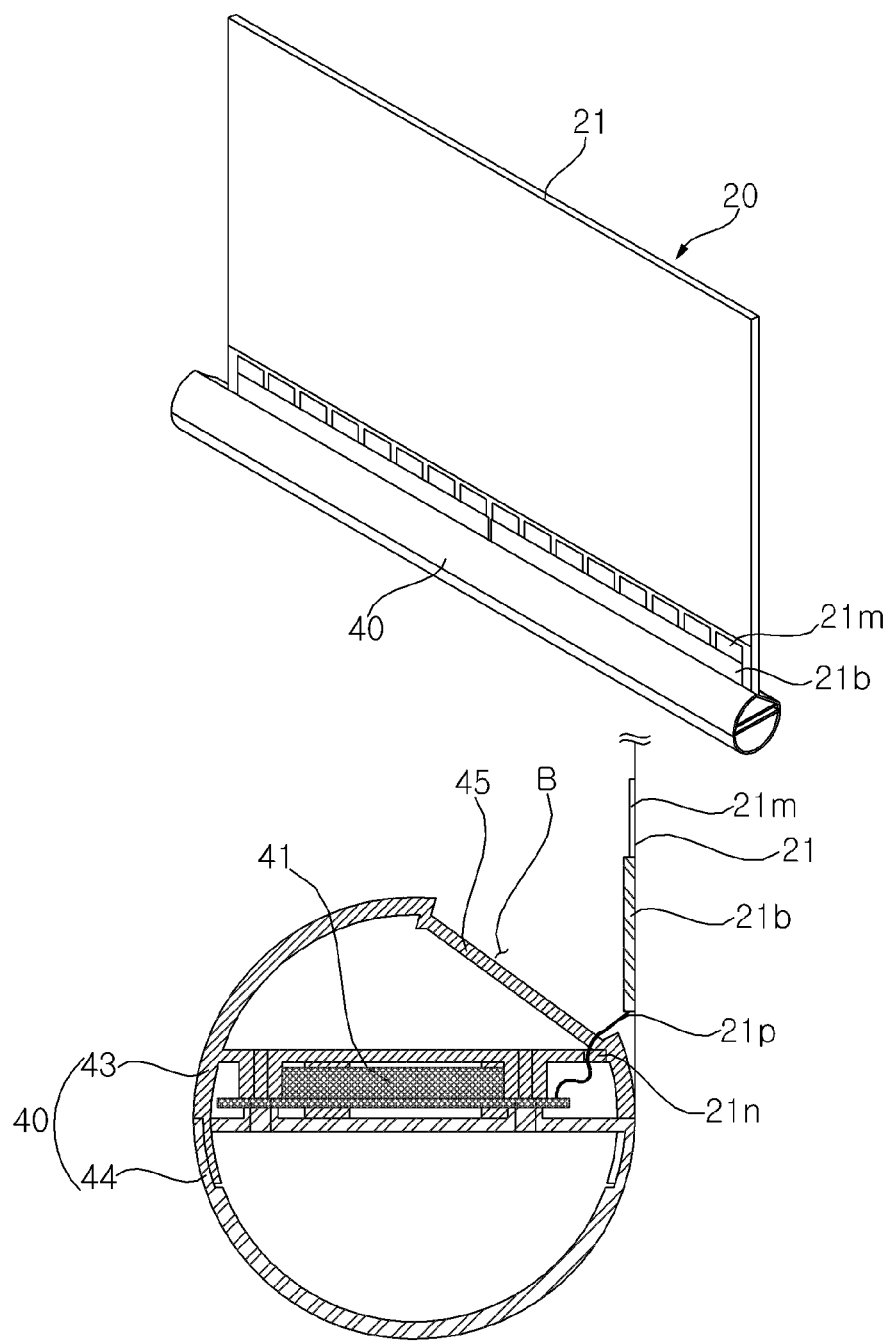

Referring to FIG. 11, the display panel 21 may be connected to the roller 40. The display panel 21 may be wound on or unwound from the roller 40. The display panel 21 may be electrically connected to a plurality of source PCBs 21*b*. The plurality of source PCBs 21*b* may be spaced apart from each other.

The source chip on film (COF) 21*m* may connect the display panel 21 and the source PCB 21*b*. The source COF 21*m* may be located in the lower side of the display panel 21.

The roller 40 may include a first part 43 and a second part 44. The first part 43 and the second part 44 may be fastened by a screw. The timing controller board 41 may be mounted inside the roller 40.

The source PCB 21*b* may be electrically connected to the timing controller board 41. The timing controller board 41 may transmit digital video data and a timing control signal to the source PCB 21*b*.

A cable 21*p* may electrically connect the source PCB 21*b* and the timing controller board 41. For example, the cable 21*p* may be a flexible flat cable (FFC). The cable 21*p* may penetrate a hole 21*n*. The hole 21*n* may be formed in a seating portion 45 or the first part 43. The cable 21*p* may be located between the display panel 21 and the second part 44.

The seating portion 45 may be formed in the outer circumference of the first part 43. The seating portion 45 may be formed by stepping a portion of the outer circumference of the first part 43. The seating portion 45 may form a space (B). When the display unit 20 is wound around the panel roller 40, the source PCB 21*b* may be received in the seating portion 45. The source PCB 21*b* may be received in the seating portion 45, so that it is not bent or crooked, and durability may be improved.

Figure 12:
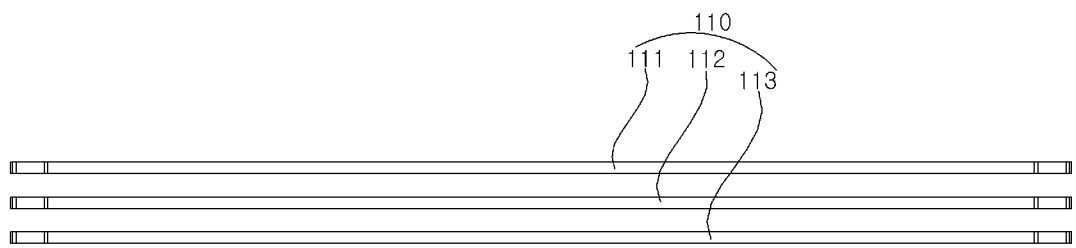
Figure 13:
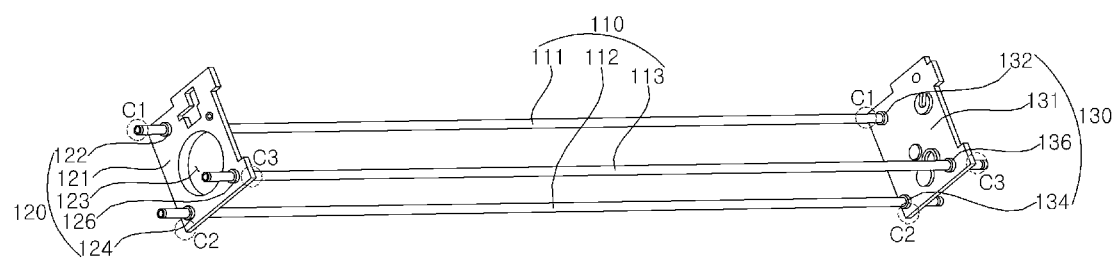

Referring to FIGS. 12 and 13, a pipe 110 may extend long in the left-right direction. There may be a plurality of pipes 110. The plurality of pipes 110 may include a first pipe 111, a second pipe 112, and a third pipe 113. The plurality of pipes 110 may be parallel to each other. For example, the pipe 110 may be a hollow cylinder. As another example, the pipe 110 may be a cylindrical bar.

The pipe 110 may be coupled to the frame 120, 130 while being inserted into the frame 120, 130. The frame 120, 130 may include a first frame 120 and a second frame 130. The first frame 120 may be located adjacent to one end of the pipes 110, and the second frame 130 may be located adjacent to the other end of the pipes 110. The first frame 120 may face the second frame 130.

For example, the frame 120, 130 may be a rectangular plate. The first pipe 111 may be inserted into the frames 120 and 130 adjacent to a first corner C1 of the first frame 120 and the second frame 130. The second pipe 112 may be inserted into the frames 120 and 130 adjacent to a second corner C2 of the first frame 120 and the second frame 130. The third pipe 113 may be inserted into the frames 120 and 130 adjacent to a third corner C3 of the first frame 120 and the second frame 130.

A central opening 123 may be formed in a plate 121 of the first frame 120. The central opening 123 may be a circle formed to pass through the plate 121 of the first frame 120. The first pipe 111, the second pipe 112, and the third pipe 113 may be disposed while forming a triangle with respect to the central opening 123.

Referring to FIG. 13, the couplers 122, 124, 126, 132, 134, and 136 may be formed on the plates 121 and 131. The first frame 120 may include an 11th coupler 122, a 12th coupler 124, and a 13th coupler 126 formed on the plate 121. The second frame 130 may include a 21st coupler 132, a 22nd coupler 134, and a 23rd coupler 136 formed on the plate 131. The first pipe 111 may be inserted into the 11th coupler 122 and the 21st coupler 132. The second pipe 112 may be inserted into the 12th coupler 124 and the 22nd coupler 134. The third pipe 113 may be inserted into the 13th coupler 126 and the 23rd coupler 136.

Figure 14:
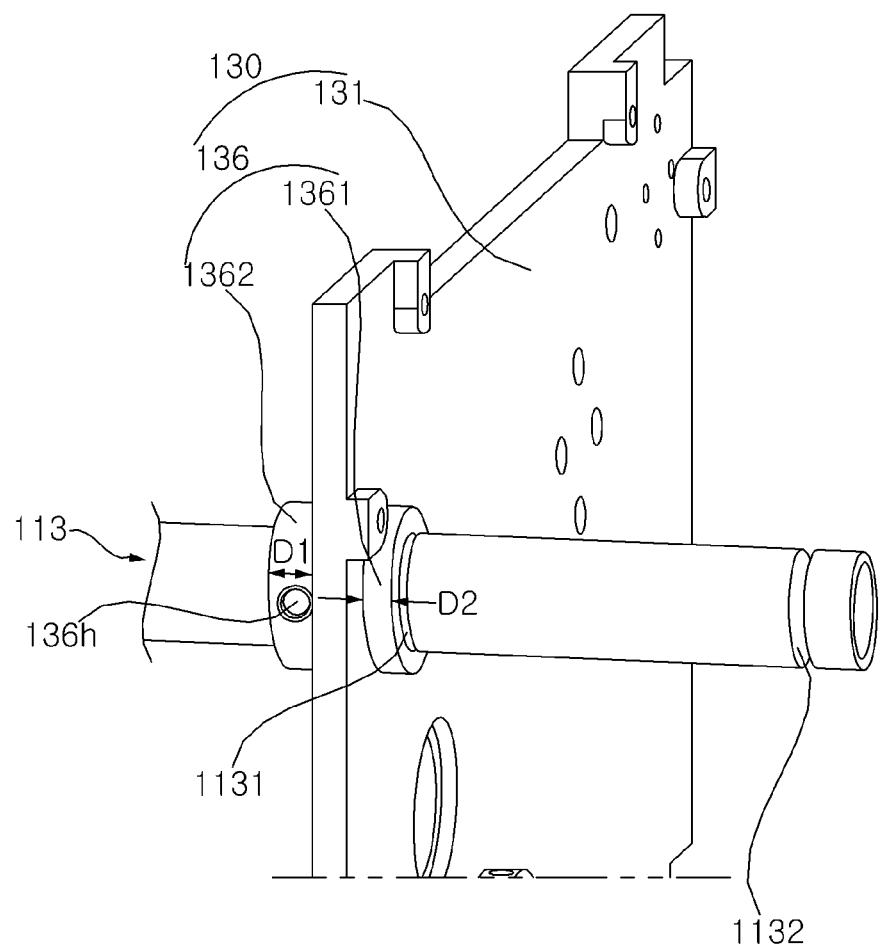
Figure 15:
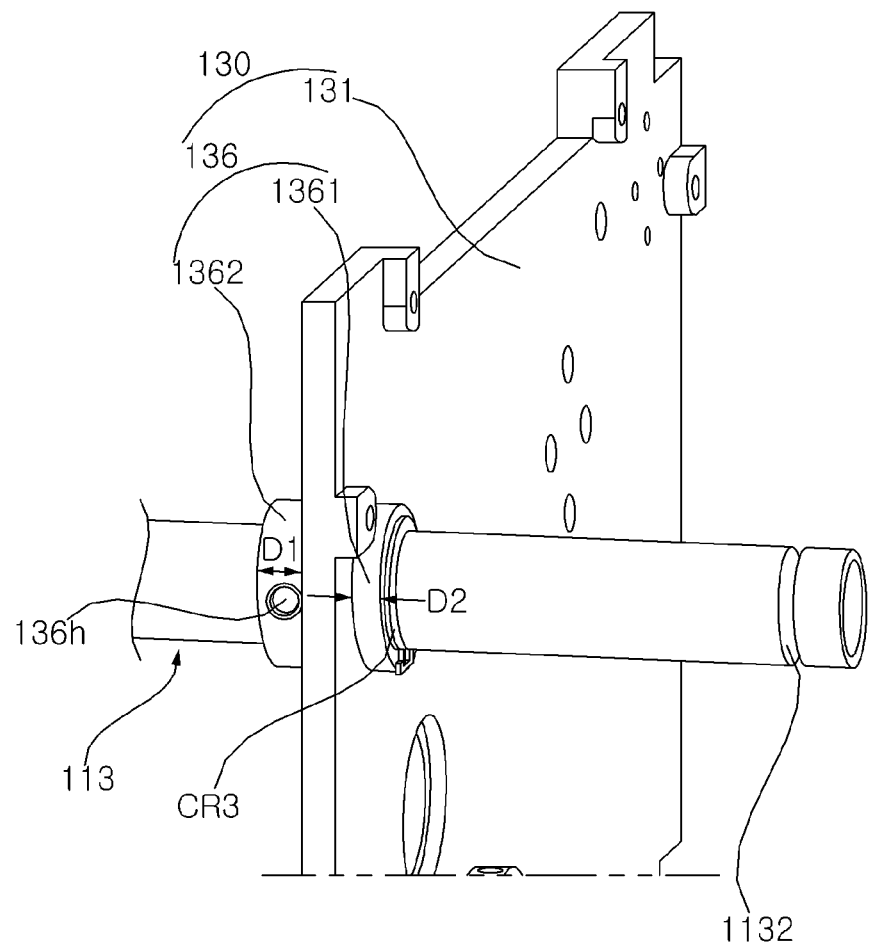
Figure 16:
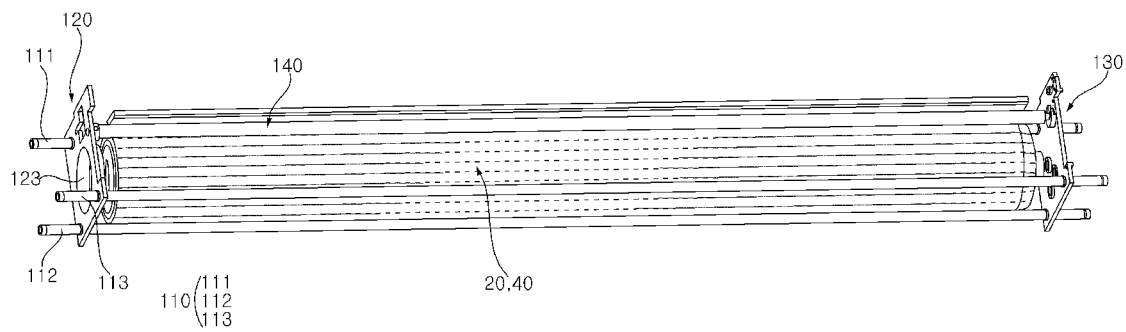
Figure 17:
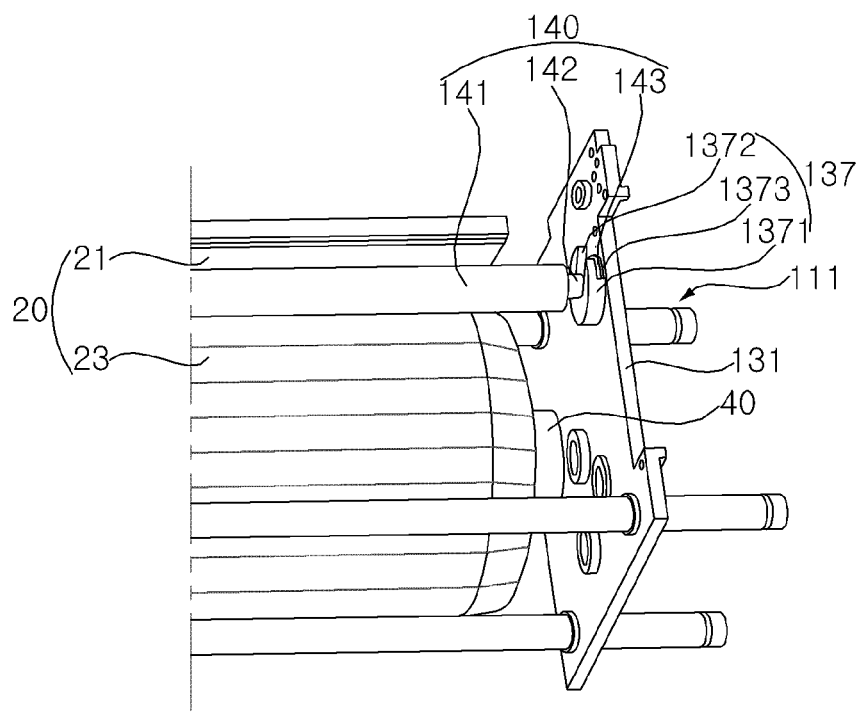
Figure 18:
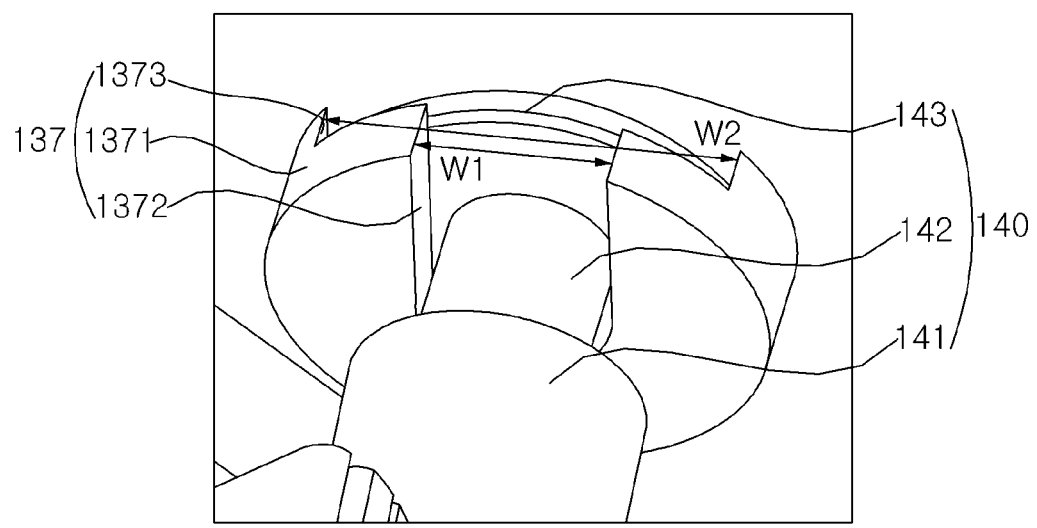
Figure 19:
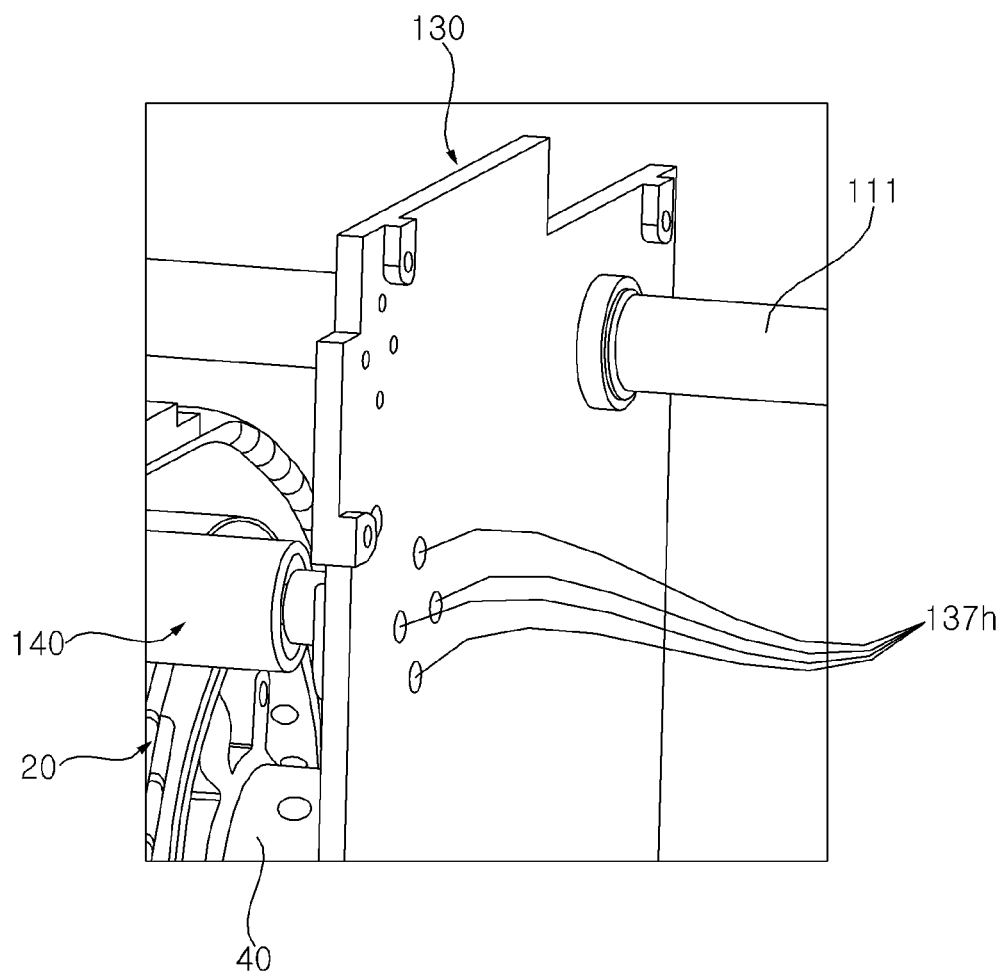

Referring to FIGS. 14 and 15, the coupler 136 may have a cylindrical shape formed to pass through the plate 131. The coupler 136 may be fixed to the plate 131, and may be formed as one body with the plate 131. The coupler 136 may have an outer side 1361 and an inner side 1362 with respect to the plate 131. The distance D2 of the outer side 1361 may be smaller than the distance D1 of the inner side 1362. A fastening hole 136*h* may be formed in the inner side 1362. The pipe 113 may be fixed to the frame 130 while a screw is fastened to the fastening hole 136*h*.

A first neck 1131 may form an engraved ring on the outer surface of the pipe 113 while being adjacent to the outer side 1361 of the coupler 136 and recessed to the inner side of the pipe 113. A second neck 1132 may be adjacent to the distal end of the pipe 113, and spaced apart from the distal end of the pipe 113 and recessed to the inner side of the pipe 113 to form an engraved ring on the outer surface of the pipe 113. The pipe 113 may be firmly fixed to the frame 130 while a coupling ring CR3 is fastened to the first neck 1131. For example, the coupling ring CR3 may be an E-ring.

Referring to FIGS. 16 to 19, the display unit 20 wound around the panel roller 40 may be inserted between a first pipe 111, a second pipe 112, a third pipe 113, a first frame 120 and/or a second frame 130. The panel roller 40 may be disposed in parallel with the first pipe 111, the second pipe 112, or the third pipe 113.

The guide roller 140 may be coupled to the frames 120 and 130 while the panel roller 40 and the display unit 20 are located between the pipes 110 and the frames 120 and 130. The guide roller 140 may include a shaft 142, a roller 141, and a fixing plate 143.

A support portion 137 may be formed on the plate 131. The support portion 137 may support the shaft 142 of the guide roller 140. The shaft 142 may be fixed to support portion 137, and the roller 140 may rotate on the shaft 142. The support portion 137 may be formed in the inner side the plate 131.

The support portion 137 may include a body 1371, a shaft groove 1372, and a plate groove 1373. The body 1371 may have a cylindrical shape protruding from the inner surface of the plate 131. The shaft groove 1372 may be recessed to the inner side of the body 1371 from the outer circumferential surface of the body 1371. The plate groove 1373 may be recessed to the inner side of the body 1371 from the outer circumferential surface of the body 1371 between the shaft groove 1372 and the plate 131. The groove width W2 of the plate groove 1373 may be greater than the groove width W1 of the shaft groove 1372.

In other words, the shaft groove 1372 may have a groove width W1 corresponding to the diameter of the shaft 142, and the plate groove 1373 may have a groove width W2 corresponding to the diameter of the fixing plate 143. The shaft 142 of the guide roller 140 may be inserted into the shaft groove 1372 of the support portion 137, and the fixing plate 143 of the guide roller 140 may be inserted into the plate groove 1373 of the support portion 137 while the guide roller 140 may be supported by the support 137.

Figure 21:
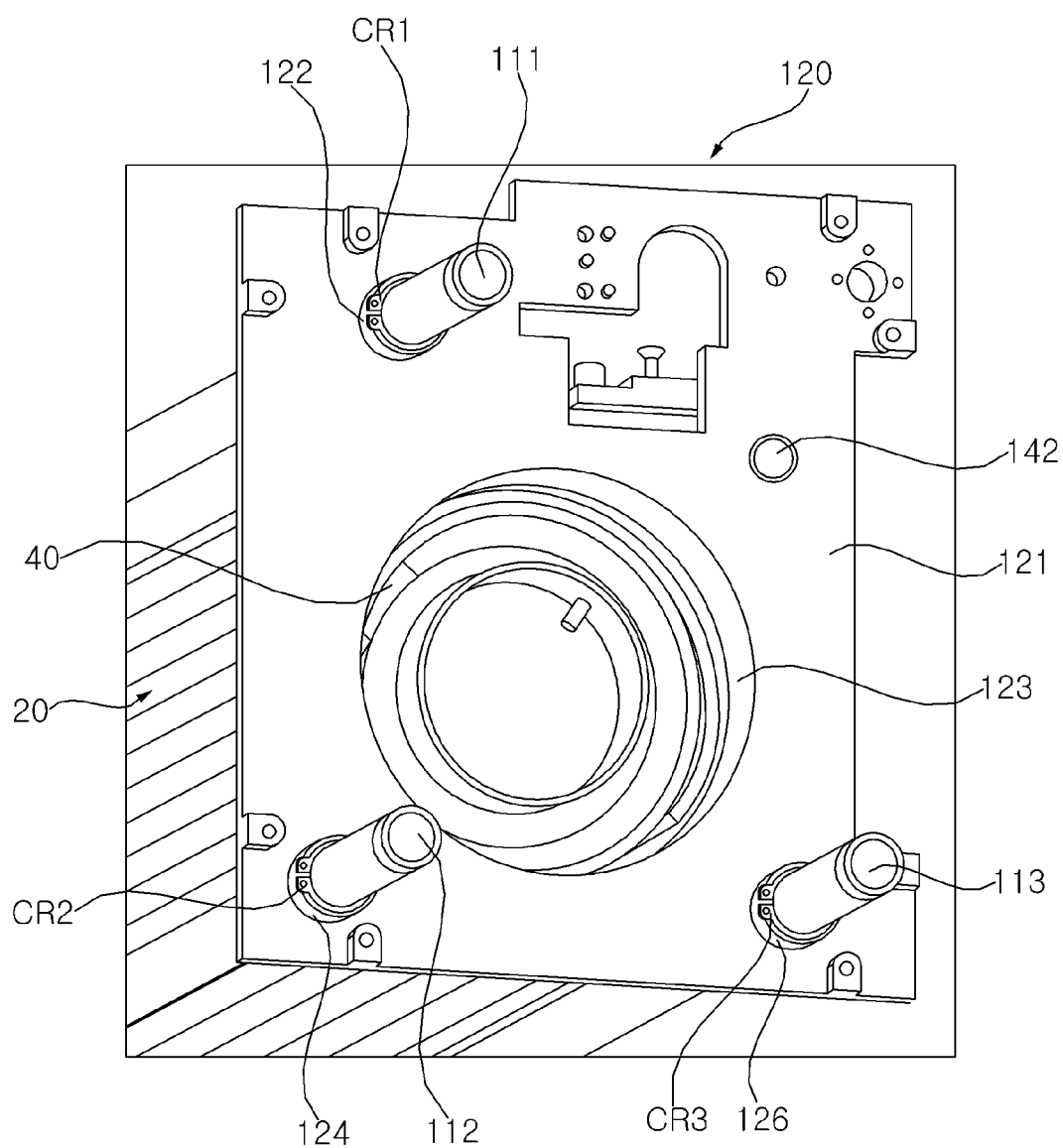
Figure 22:
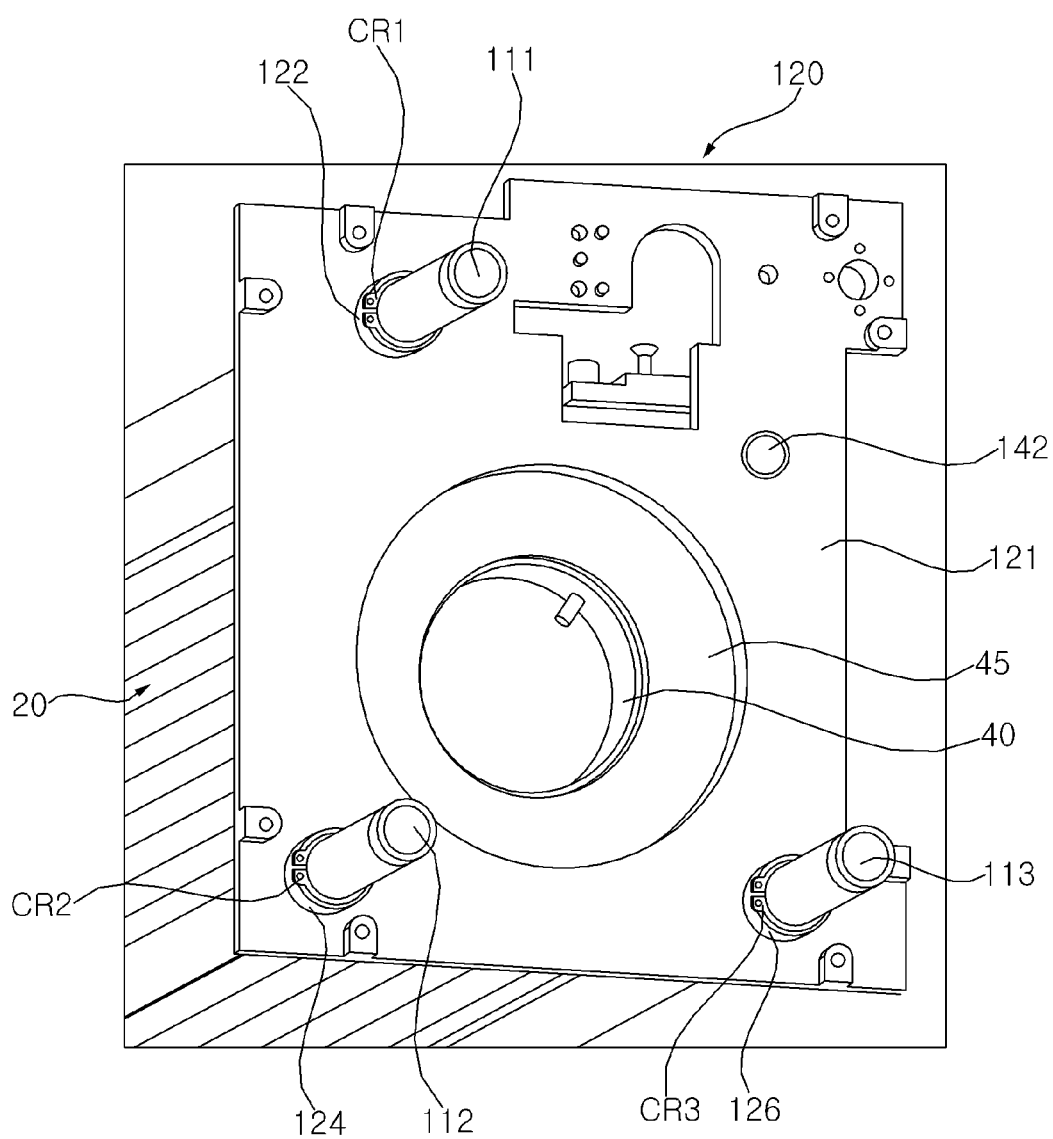
Figure 23:
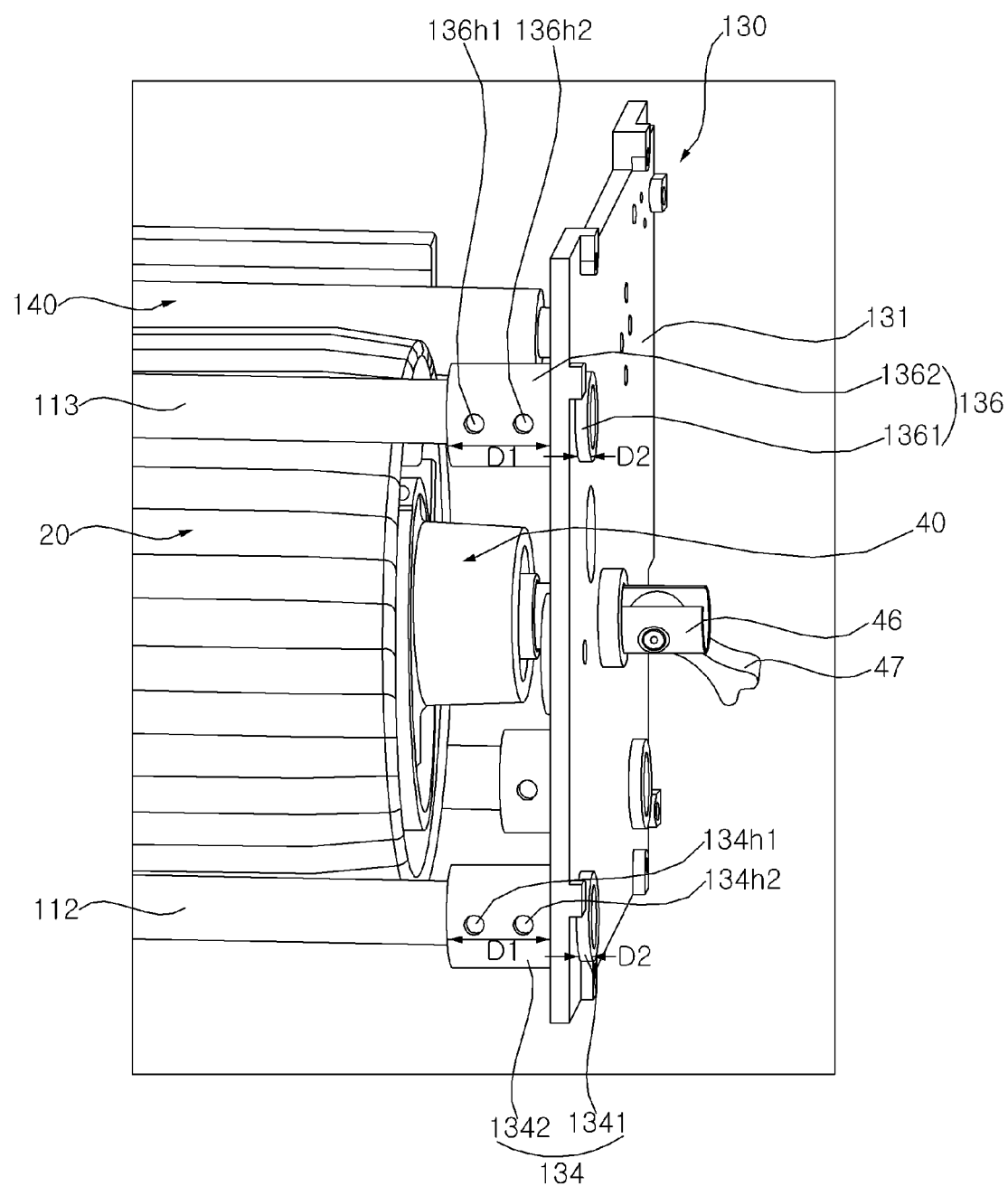
Figure 24:
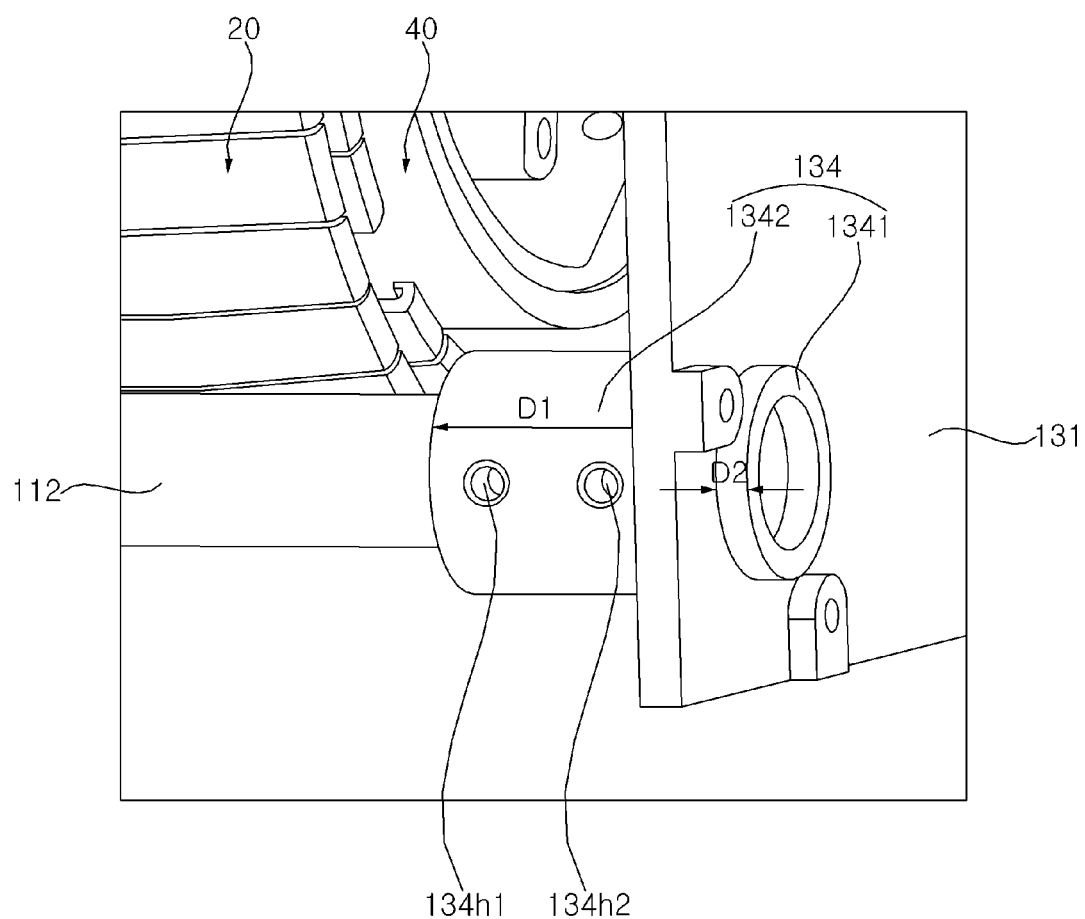

The fixing plate 143 may be fixed to the frame 130 by a fastening member (e.g. a screw) fastened to fastening holes 137h penetrating the frame 130. Referring to FIG. 21, the shaft 142 may be inserted into and fixed to the frame 120.

Figure 20:
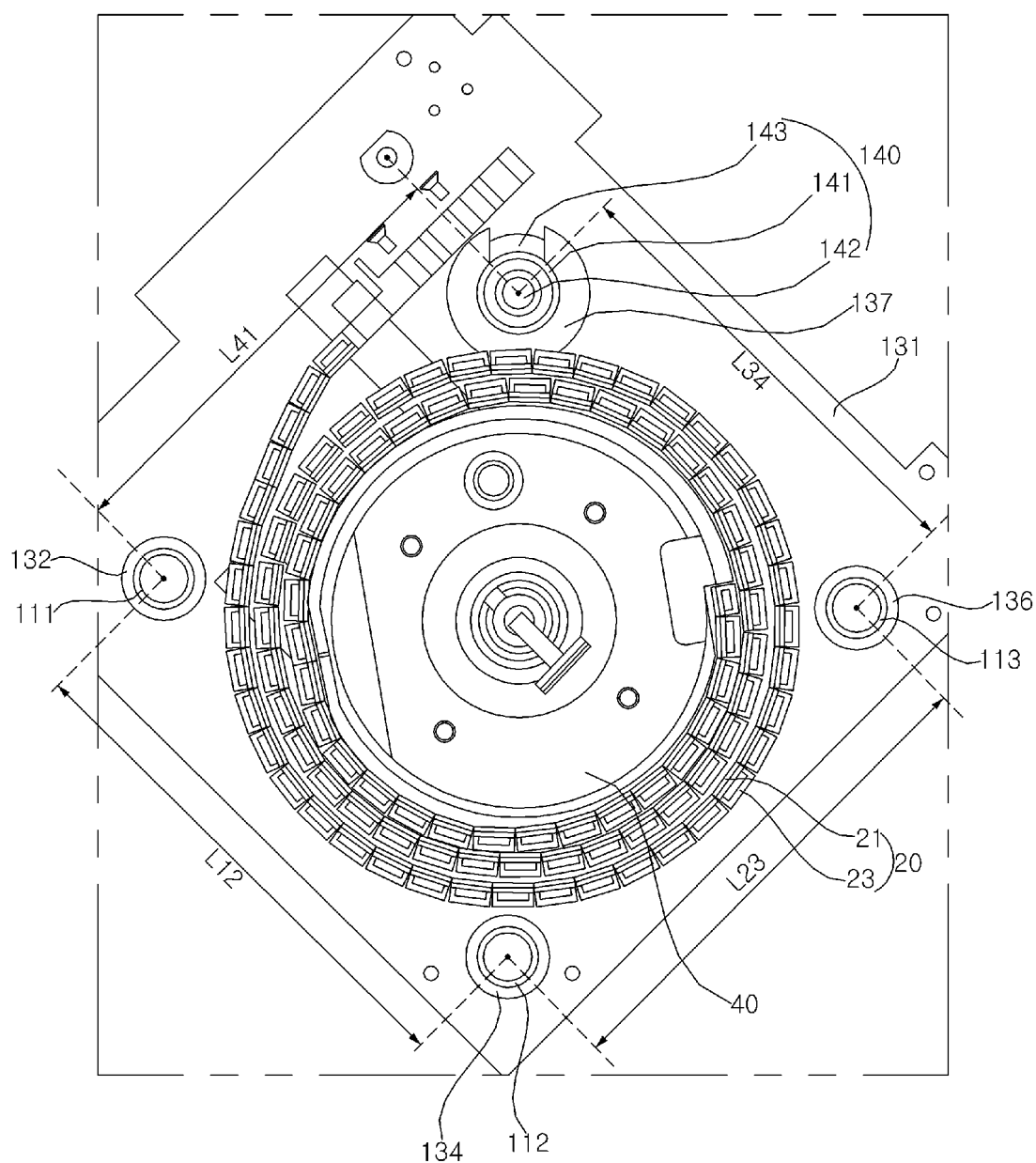

Referring to FIG. 20, the distance L12 between the first pipe 111 and the second pipe 112 may be greater than the distance L23 between the second pipe 112 and the third pipe 113. The distance L12 between the first pipe 111 and the second pipe 112 may be greater than the distance L34 between the third pipe 113 and the guide roller 140. The distance L12 between the first pipe 111 and the second pipe 112 may be greater than the distance L41 between the first pipe 111 and the guide roller 140. The distance L23 between the second pipe 112 and the third pipe 113 may be greater than the distance L41 between the first pipe 111 and the guide roller 140.

The distance L23 between the second pipe 112 and the third pipe 113 may be greater than the distance L34 between the third pipe 113 and the guide roller 140. The distance L34 between the third pipe 113 and the guide roller 140 may be greater than the distance L41 between the guide roller 140 and the first pipe 111. Accordingly, it is possible to improve the torsional rigidity of the display device as well as the deflection rigidity.

Referring to FIGS. 21 to 24, one end of the panel roller 40 may be located adjacent to the central opening 123 of the first frame 120. The rotation shaft of the panel roller 40 may be aligned with the center of the central opening 123 of the first frame 120. A bearing 45 may be mounted on the central opening 123 of the first frame 120. For example, the bearing 45 may be a ring bearing 45. One end of the panel roller 40 may be inserted or press-fitted into the bearing 45. The other end of the panel roller 40 may be rotatably coupled to the second frame 130. The panel roller 40 may include a rotation shaft 46, and the rotation shaft 46 may penetrate the first frame 130 and be installed in the second frame 130. The rotation shaft 46 may be connected to a lever 47, and the panel roller 40 may be manually rotated through the lever 47.

The coupler 136 may have a cylindrical shape formed to pass through the plate 131. The coupler 136 may be fixed to the plate 131, and may be formed as one body with the plate 131. The coupler 136 may have an outer side 1361 and an inner side 1362 with respect to the plate 131. The distance D2 of the outer side 1361 may be smaller than the distance D1 of the inner side 1362. For example, the distance D1 of the inner side 1362 may be 5 times or more of the distance D2 of the outer side 1361.

The pipes 112 and 113 may be press-fitted to the outer side 1341 and 1361 by penetrating the inner side 1342 and 1362 of the couplers 134 and 136. The pipes 112 and 113 may not penetrate the couplers 134 and 136. The outer side 3141 and 1361 of the couplers 134 and 136 may cover the distal end of the pipes 112 and 113. A first fastening hole 136h1 and a second fastening hole 136h2 may be formed in the inner side 1362. As screws are fastened to the first fastening hole 136h1 and the second fastening hole 136h2, the pipe 113 may be firmly fixed to the frame 130.

According to an aspect of the present disclosure, provided is a display device including: a flexible display panel; a roller which extends long, and on which the display panel is wound or from which the display panel is unwound; a first pipe which extends long in a length direction of the roller, and is located adjacent to the roller; and a second pipe which extends long in a length direction of the roller, and is located adjacent to the roller, and faces the first pipe with respect to the roller.

In addition, according to another aspect of the present disclosure, further provided is a third pipe which extends long in a length direction of the roller, and is located adjacent to the roller at between the first pipe and the second pipe; and a guide roller which extends long in a length direction of the roller, and faces the third pipe with respect to the roller, and the display panel is located between the first pipe, the second pipe, and the third pipe and the roller, and is wound on or unwound from the roller.

In addition, according to another aspect of the present disclosure, further provided is a first frame located adjacent to one end of the roller; and a second frame which is located adjacent to the other end of the roller, and faces the first frame with respect to the roller, and the first pipe and the second pipe are inserted to pass through the first frame, and the first pipe and the second pipe are inserted to pass through the second frame.

In addition, according to another aspect of the present disclosure, the first frame includes: a plate; and a coupler which is formed to pass through the plate, and formed between an outer circumferential surface of the first pipe and the plate, wherein the coupler includes: an inner side located between the roller and the plate; and an outer side that faces the inner side with respect to the plate, wherein a first distance between a distal end of the inner side and the plate is greater than a second distance between a distal end of the outer side and the plate.

In addition, according to another aspect of the present disclosure, the first pipe includes a neck that is located adjacent to the distal end of the outer side, and is recessed to an inner side of the first pipe, and further includes a coupling ring fitted to the neck.

In addition, according to another aspect of the present disclosure, the pipe is fixed to the inner side of the coupler by a screw.

In addition, according to another aspect of the present disclosure, further provided is a first frame located adjacent to one end of the roller; and a second frame which is located adjacent to the other end of the roller, and faces the first frame with respect to the roller, wherein the first pipe and the second pipe are inserted to pass through the first frame, and the first pipe and the second pipe are inserted to pass through the second frame, wherein the guide roller includes: a shaft having one end fixed to the first frame; a roller which surrounds an outer circumferential surface of the shaft, and rotates on the shaft; and a fixing plate which is formed in the other end of the shaft, and fixed to an inner surface of the second frame, wherein the second frame includes a support portion formed on the inner surface of the second frame, wherein the support portion includes: a body protruding from the inner surface of the second frame; a shaft groove recessed to an inner side of the body from an outer circumferential surface of the body; and a plate groove recessed to the inner side of the body at between the shaft groove and the second frame, wherein the shaft groove supports the shaft of the guide roller, and the plate groove supports the fixing plate.

In addition, according to another aspect of the present disclosure, a groove width of the plate groove is greater than a groove width of the shaft groove.

In addition, according to another aspect of the present disclosure, a distance between the first pipe and the second pipe is greater than a distance between the second pipe and the third pipe, the distance between the first pipe and the second pipe is greater than a distance between the third pipe and the guide roller, and the distance between the first pipe and the second pipe is greater than a distance between the first pipe and the guide roller.

In addition, according to another aspect of the present disclosure, a distance between the second pipe and the third pipe is greater than the distance between the first pipe and the guide roller, the distance between the second pipe and the third pipe is greater than the distance between the third pipe and the guide roller, and the distance between the third pipe and the guide roller is greater than the distance between the guide roller and the first pipe.

In addition, according to another aspect of the present disclosure, the first frame includes: a first plate; and a central opening formed to pass through the first plate, wherein one end of the roller is inserted into the central opening.

In addition, according to another aspect of the present disclosure, further provided is a bearing inserted into between one end of the roller and the central opening.

In addition, according to another aspect of the present disclosure, the roller includes a rotation shaft formed in the other end of the roller, wherein the rotation shaft is rotatably coupled to the second frame by passing through the second frame, and further includes a lever provided in a distal end of the rotation shaft protruding to pass through the second frame.

In addition, according to another aspect of the present disclosure, further provided is a module cover that extends long in a length direction of the roller, and has a plurality of segments sequentially arranged in an up-down direction of the display panel on a rear surface of the display panel, wherein the display panel and the module cover are wound on or unwound from the roller.

In addition, according to another aspect of the present disclosure, the display panel descends while being unwound from the roller, and ascends while being wound on the roller.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A display device comprising:
a flexible display panel;
a roller configured to controllably wind up and unwind the display panel;
a first pipe which extends in a length direction of the roller, and which is located adjacent to the roller; and
a second pipe which extends in the length direction of the roller, and which is located adjacent to the roller, and which faces the first pipe with respect to the roller;
a first frame located adjacent to a first end of the roller; and
a second frame which is located adjacent to a second end of the roller opposite from the first end of the roller, and which faces the first frame with respect to the roller,
wherein the first pipe and the second pipe are configured to be inserted into the first frame so as to pass through the first frame,
wherein the first pipe and the second pipe are configured to be inserted into the second frame so as to pass through the second frame,
wherein the first frame comprises:
a first plate; and
a central opening formed in the first plate, and
wherein one end of the roller is inserted into the central opening.
2. The display device of claim 1, further comprising:
a third pipe which extends long in the length direction of the roller, and which is located adjacent to the roller at a location between the first pipe and the second pipe; and
a guide roller which extends in the length direction of the roller, and which faces the third pipe with respect to the roller,
wherein the display panel is located between the first pipe, the second pipe, and the third pipe and the roller, and is configured to be wound on or unwound from the roller.
3. The display device of claim 1, wherein the first frame comprises:
a plate; and
a coupler which is formed to pass through the plate, and formed between an outer circumferential surface of the first pipe and the plate,
wherein the coupler comprises:
an inner side located between the roller and the plate; and
an outer side that faces the inner side with respect to the plate, wherein a first distance between a distal end of the inner side and the plate is greater than a second distance between a distal end of the outer side and the plate.

4. The display device of claim 3, wherein the first pipe comprises a neck that is located adjacent to the distal end of the outer side, and which is recessed to an inner side of the first pipe, and
wherein the display device further comprises a coupling ring fitted to the neck.

5. The display device of claim 4, wherein the pipe is fixed to the inner side of the coupler by a screw.

6. The display device of claim 2, further comprising:
a first frame located adjacent to a first end of the roller; and
a second frame which is located adjacent to second end of the roller opposite to the first end of the roller, and which faces the first frame with respect to the roller,
wherein the first pipe and the second pipe are configured to be inserted into the first frame so as to pass through the first frame, and
the first pipe and the second pipe are configured to be inserted into the second frame so as to pass through the second frame,
wherein the guide roller comprises:
a shaft having one end fixed to the first frame;
a roller which surrounds an outer circumferential surface of the shaft, and rotates on the shaft; and
a fixing plate which is formed in the other end of the shaft, and which is fixed to an inner surface of the second frame,
wherein the second frame comprises a support portion formed on the inner surface of the second frame,
wherein the support portion comprises:
a body protruding from the inner surface of the second frame;
a shaft groove recessed to an inner side of the body from an outer circumferential surface of the body; and
a plate groove recessed to the inner side of the body at between the shaft groove and the second frame,
wherein the shaft groove supports the shaft of the guide roller, and
the plate groove supports the fixing plate.

7. The display device of claim 6, wherein a groove width of the plate groove is greater than a groove width of the shaft groove.

8. The display device of claim 2, wherein a distance between the first pipe and the second pipe is greater than a distance between the second pipe and the third pipe,
the distance between the first pipe and the second pipe is greater than a distance between the third pipe and the guide roller, and
the distance between the first pipe and the second pipe is greater than a distance between the first pipe and the guide roller.

9. The display device of claim 8, wherein a distance between the second pipe and the third pipe is greater than the distance between the first pipe and the guide roller,
the distance between the second pipe and the third pipe is greater than the distance between the third pipe and the guide roller, and
the distance between the third pipe and the guide roller is greater than the distance between the guide roller and the first pipe.

10. The display device of claim 1, further comprising a bearing inserted between one end of the roller and the central opening.

11. The display device of claim 10, wherein the roller comprises a rotation shaft formed in the other end of the roller,
wherein the rotation shaft is rotatably coupled to the second frame and passes through the second frame, and
wherein the display device further comprises a lever provided in a distal end of the rotation shaft protruding to pass through the second frame.

12. The display device of claim 1, further comprising a module cover that extends in the length direction of the roller, and which has a plurality of segments sequentially arranged in an up-down direction of the display panel on a rear surface of the display panel,
wherein the display panel and the module cover are wound on or unwound from the roller.

13. The display device of claim 1, wherein the display panel descends while being unwound from the roller, and ascends while being wound on the roller.

* * * * *